Dec. 23, 1947.　　　M. W. MANCINI　　　2,433,136
ARM FOR AERIAL PICK-UP SYSTEMS
Filed Dec. 11, 1943　　　4 Sheets-Sheet 1
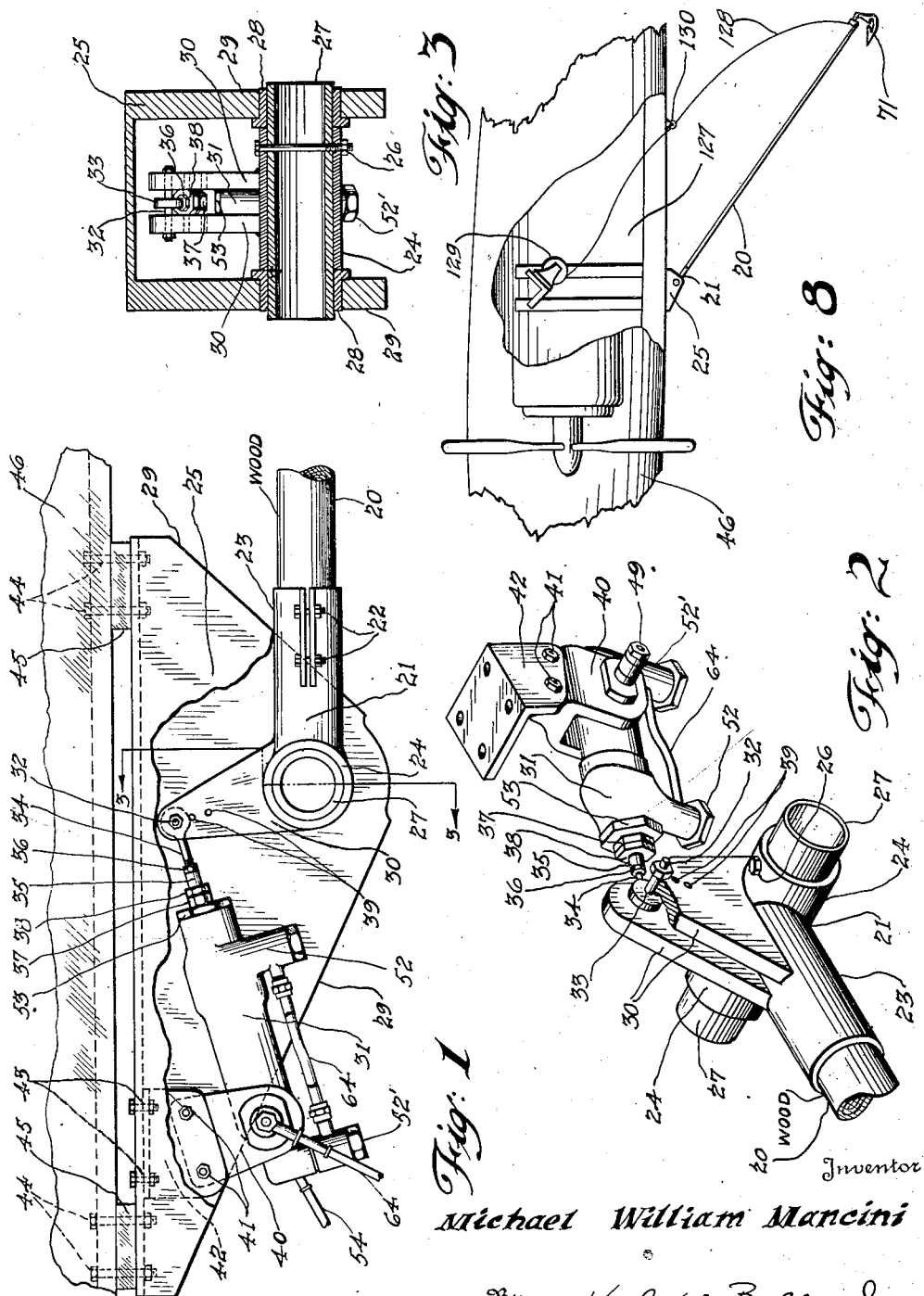
Inventor
Michael William Mancini
By Hyde W. Ballard
Attorney
Witnesses:

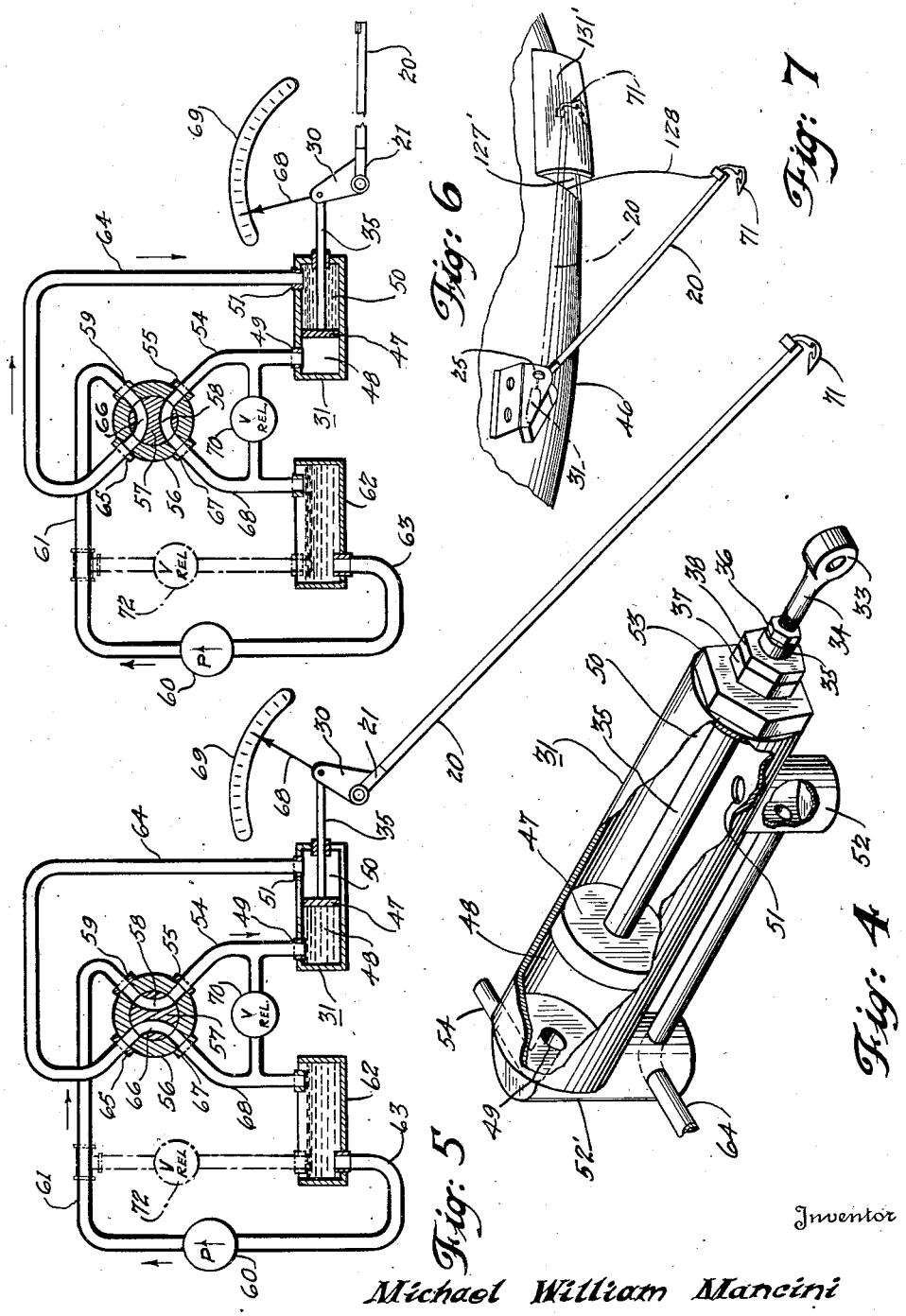

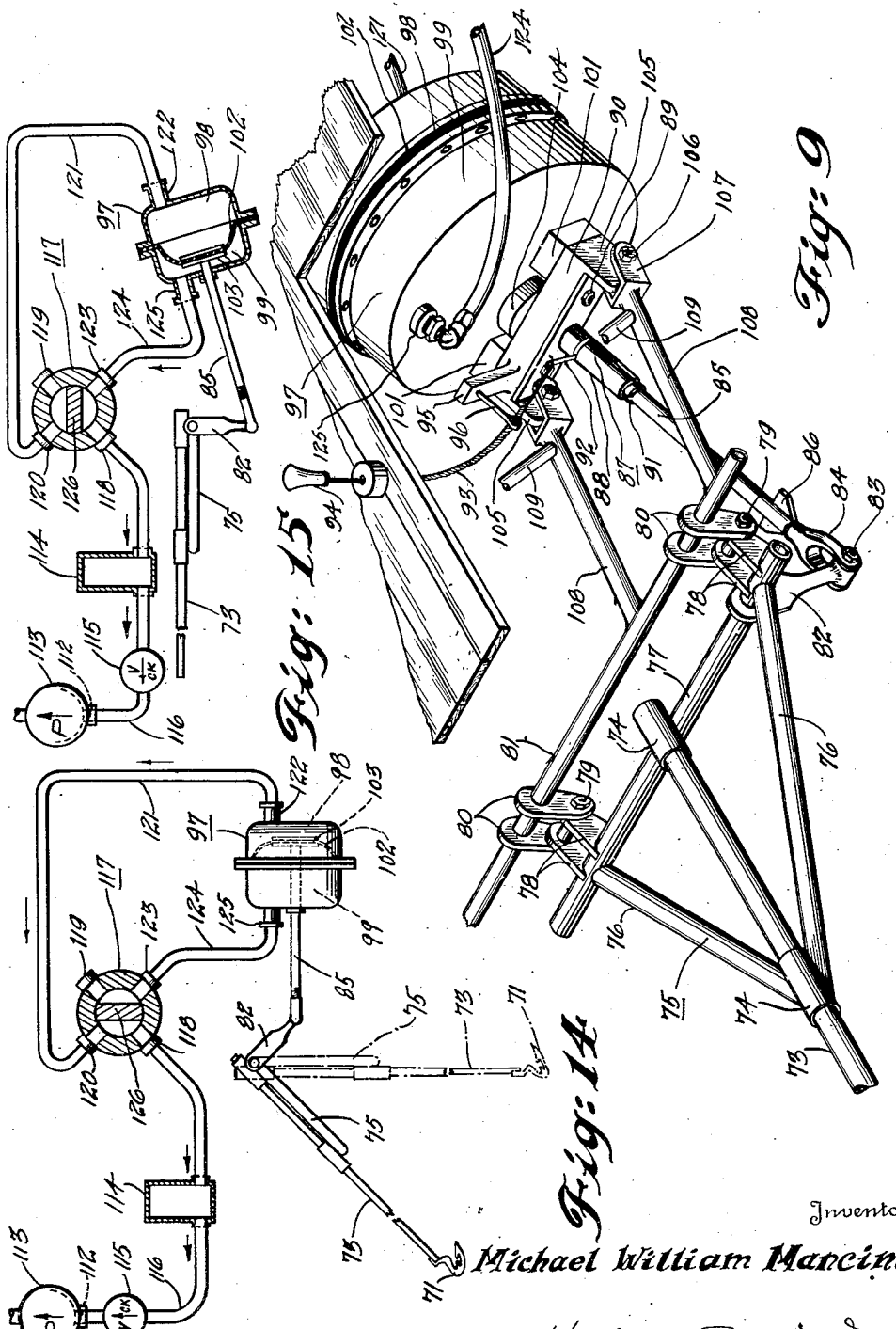

Dec. 23, 1947. M. W. MANCINI 2,433,136
ARM FOR AERIAL PICK-UP SYSTEMS
Filed Dec. 11, 1943 4 Sheets-Sheet 4
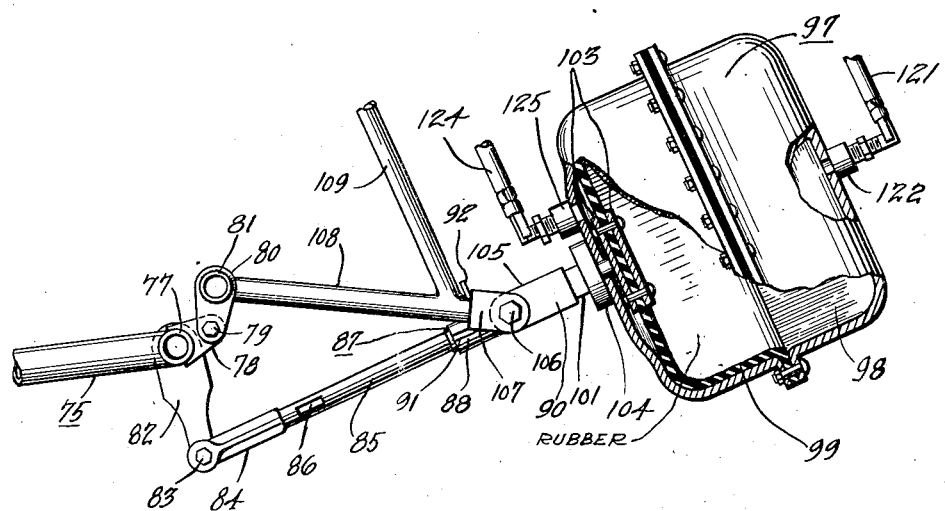
Fig. 10
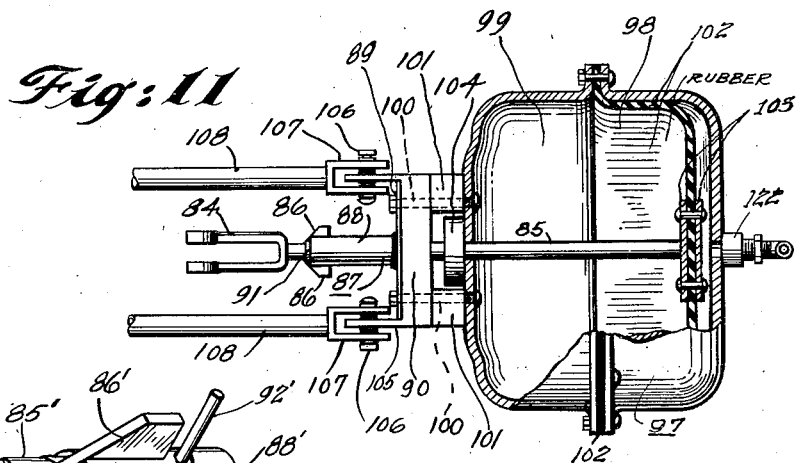
Fig. 11
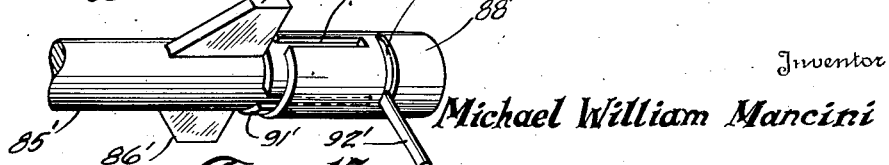
Fig. 12
Fig. 13
Inventor
Michael William Mancini
Witnesses:

Patented Dec. 23, 1947

2,433,136

UNITED STATES PATENT OFFICE 2,433,136

ARM FOR AERIAL PICKUP SYSTEMS

Michael William Mancini, Pittsburgh, Pa., assignor to All American Aviation, Inc., Wilmington, Del., a corporation of Delaware Application December 11, 1943, Serial No. 513,834

5 Claims. (Cl. 258—1.2)

My invention relates to aircraft pick-up and delivery apparatus and more particularly to a pick-up arm therefor.

Customarily, a pick-up arm attached to an aircraft is used to pick up cargo and gliders. To accomplish a pick-up, a ground station is ordinarily used consisting of two upright poles with a pick-up loop stretched between them and held by releasable clips. This loop is connected to a tow line attached to a cargo container or glider. A pick-up arm depending from the aircraft has at its outer tip a releasable hook.

In previous practice the arm has been manually actuated by an operator in the pick-up aircraft. This caused no end of difficulty when making pick-ups under adverse conditions at times when extreme ease and speed of control are essential. Furthermore, a rigidly positioned and locked arm was unsatisfactory due to breakage which occurred should the arm strike an obstacle or a pick-up be attempted at increased air speeds. Several types of resilient and releasable positioning devices were tried, including rubber shock cord, but these proved impractical since the amount of resilience was fixed and hence not flexible enough to suit different conditions of speed, wind, and weight.

Obviously, too much rigidity in the arm may cause breakage, but ample stability must be provided to assure positive engagement of the hook. The importance of this problem will be evident when it is appreciated that the loop must remain in contact with the arm from the time the arm first strikes the loop until the loop becomes firmly engaged in the hook. Should the arm bounce back at the instant of initial contact with the loop, no pick-up will result since the hook will be carried back by the arm and its engagement in the hook prevented.

While I appreciate that it would be possible to substitute within the scope of my invention various activating and positioning means for the arm, I prefer to employ a hydraulic or a pneumatic device.

In accordance with the invention, the arm is actuated by a piston or diaphragm and a piston rod connected to the arm. Movement and positioning of the arm are resiliently accomplished by fluid under high or low pressure within a cylinder, supplied from a hydraulic or other system conveniently installed in the aircraft. Furthermore, the operator may control the arm by manipulating a valve located in any part of the aircraft.

A main object of the invention, therefore, is to provide a pick-up arm which may be quickly and accurately positioned with the aid of a fluid pressure device.

Another object of the invention is to provide control means for actuating a pick-up arm which may be located in any position in the aircraft irrespective of the location of the arm.

Another object of the invention is to provide a resiliently positioned pick-up arm.

A further object of the invention is to provide a pick-up arm held securely but resiliently in pick-up position and a safety device whereby excessive impact on the arm will not cause it to break.

A still further object is to provide control and indicating means whereby the arm may be actuated over a wide range of positions.

A further object is to provide a selector valve, and a pressure responsive device actuated thereby connected to a pick-up arm.

Another object is to provide a relief valve in a hydraulic system so that excessive pressure resulting when the arm strikes an obstacle may be safely vented.

A further object is to provide a compressible fluid for actuating the arm operating apparatus so that the shock resulting when the arm strikes an obstacle may be absorbed without damage.

Another object is the provision, in a compressible fluid arm actuating apparatus of a stop mechanism for positively positioning the arm.

Figure 1 is a fragmentary elevation of the structure of a hydraulic arm actuating apparatus.

Figure 2 is a fragmentary perspective view of a part of the structure shown in Figure 1.

Figure 3 is a section taken along line 3—3 of Figure 1.

Figure 4 is a diagrammatic perspective of a type of hydraulic cylinder partially exposed.

Figure 5 is a diagram of a hydraulic arm actuating system showing the arm in the pick-up position.

Figure 6 is a diagram corresponding to Figure 5 showing the arm in the raised position.

Figure 7 illustrates how the invention may be employed to install the arm, pivot and bracket in an otherwise inaccessible location.

Figure 8 is a fragmentary elevation of an aircraft showing another installation of the arm and cooperating mechanism.

Figure 9 is a partly fragmentary somewhat diagrammatic perspective view of a pneumatic arm operating mechanism.

Figure 10 is an elevation of the arm actuating apparatus of Figure 9 with the piston extended and the arm in the raised position.

Figure 11 is a bottom view of a portion of the structure of Figure 10 but with the piston retracted to its maximum position.

Figure 12 is a detail perspective of a piston travel regulating device.

Figure 13 is a detail perspective of the structure of Figure 12 shown in an alternative regulating position.

Figure 14 is a diagram of the pneumatic arm actuating system showing the arm in the pick-up position.

Figure 15 is a diagram corresponding to Figure 14 but with the arm shown in the raised position.

In one form of the invention, shown by Figures 1 to 6, an arm 20, preferably of wood, is clamped in a trunnion member 21 by bolts 22. Trunnion 21 consists of arm supporting tubular section 23 welded at right angles to tubular member 24 which, after assembly in bracket 25, is secured by bolt 26 to bearing sleeve 27, as shown in Figure 3. Annular bushings 28 pressed into side members 29 of bracket 25 provide bearing surfaces and support for bearing sleeve member 27 and trunnion 21.

Formed integrally with the trunnion are vertical fins 30 with which an actuating cylinder 31 cooperates to pivot trunnion 21 and sleeve 27 in bushings 28. Cylinder 31 is connected to fins 30 by pin 32 which passes through an eye 33 of enlarged end of rod 34, which in turn forms an extension of piston rod 35.

Means for adjusting the effective working length of piston rod 35 is provided by threaded engagement between rod 34 and piston rod 35, locked by nut 36. Excess piston travel is prevented by stop nut 37 externally threaded on piston rod 35 and locked by nut 38. Additional adjustment of the relative position of the piston and arm may be provided by a plurality of holes 39 in fins 30. The forward end of cylinder 31 is pivotally supported by bracket 40 fastened by bolts 41 to mounting 42 which is attached to principal mounting bracket 25 by means of bolts 43. Bracket 25 is attached by means of bolts 44 through blocks 45 to a structural member of an aircraft 46.

Hydraulic cylinder 31, shown diagrammatically in Figure 4, has piston rod 35 integral with a piston 47 adapted to reciprocate therein. Fluid is admitted into or out of the forward end 48 of the cylinder through orifice 49 and the rear end 50 through orifice 51. Manifolds 52 permit easy attachment of hydraulic tubing and fittings to the cylinder and orifices. Packing nut 53 prevents fluid from escaping from around the rod. It will be obvious from the above that movement of the arm is controlled by motion of the piston and piston rod within the cylinder.

The manner in which this is accomplished may be understood by referring now to Figures 5 and 6.

Figure 5 shows fluid being admitted to the cylinder through the port 49 which forces the piston 47 to the right in the figure thereby lowering the arm. Port 49 is connected to line 54 and port 55 of a selector valve 56. When it is desired to introduce fluid under pressure into the forward end of the cylinder through port 49, barrel 57 of the selector valve 56 is turned so that passage 58 connects port 59 with port 55. Port 59 is connected to the outlet or pressure side of an ordinary hydraulic pump 60 by means of line 61. The inlet side of pump 60 is connected to a reservoir 62 through line 63. In order to provide an exhaust for fluid on the low pressure side of piston 47, port 51 is simultaneously connected with reservoir 62 through line 64, port 65 of the selector valve, passage 66, port 67, and line 68. It will be obvious that proper positioning of barrel 57 simultaneously allows fluid to enter port 65 and exhaust through port 67. When the arm is lowered to the desired angle, as indicated by pointer 68 on quadrant 69, barrel 57 may be turned, if desired, to an intermediate position preventing further pressure from being introduced into line 54.

Since the fluid employed in the system of Figure 5 is substantially incompressible, for example as oil, a suitable relief valve 70 is connected between pressure line 54 and return line 68. It will be understood that the setting of relief valve 70 is such that the arm 20 will be maintained in pick-up position with only sufficient force to insure positive engagement of the hook 71. Should this force be exceeded as, for example, a landing be attempted with the arm down, the excessive pressure thereby created in the forward end 48 of cylinder 31 will cause the relief valve 70 to open and to permit fluid to return to the reservoir.

In Figure 6 the flow of pressure fluid to the opposite end 50 of the cylinder is illustrated. This occurs when barrel 57 of selector valve 56 is turned to connect port 55 with port 67 and port 59 with port 65, pressure now being applied to the other side of piston 47, and forward end 48 of cylinder 31 being connected to the return line 68, the piston travels to the left in Figure 6 thereby raising the arm to a substantially horizontal position which may likewise be determined by the operator from the pointer 68.

As the arm travels downwards, actuated by the response of the piston and piston rod to the pressure of the hydraulic fluid, it may be stopped in any position by regulating the selector valve until it is in neutral shutting off the valve entirely. The operator has complete positive control of the arm at every point, assuring a wide range of operating positions. It will be apparent that a suitable means for ascertaining the position of the arm may be provided. Such a device, shown diagrammatically at Figures 5 and 6, may consist of a pointer 68 which may be affixed to the arm actuating trunnion 21 or fins 30 or some other moving part. The pointer is designed to travel across a suitably calibrated semicircular plate or quadrant 69 adapted to indicate the position of the arm with respect to the aircraft.

As soon as the arm has reached the desired horizontal position, the selector valve may be turned to intermediate or neutral position thus retaining the arm 20 in place. Under these conditions, it will be apparent that the pump 60 should be stopped to avoid excessive pressure in lines 61 and 64 or if desired, a second relief valve 72 may be placed between line 61 and reservoir 62.

Another manner in which a pick-up arm may be resiliently positioned is illustrated in Figures 9 to 15 in which a vacuum or pressure responsive device may be employed to advantage. The arrangement for fluid control depicted in Figs. 5 and 6 may also be employed in conjunction with the vacuum or pressure responsive mechanism now to be described.

Arm 73 is clamped in sleeves 74 centrally positioned on a yoke 75 of triangular configuration consisting of diagonal members 76 and axle member 77 pivotally supported by integral brackets 78 and bolts 79 to cooperating brackets 80 depending from member 81 conveniently constructed of tubing which may be a structural part of the aircraft. A horn 82 welded to the axle member 77 of the yoke is secured by bolt 83 to clevis 84 threaded to the end of piston rod 85 and providing adjustment of the operating length of the piston rod. A pair of lugs 86 integral with the piston rod cooperate with a piston travel regulating device 87 consisting of an outer slotted sleeve 88 welded to the top plate 89 of a bracket 90 centrally drilled to accommodate the piston rod 85. An inner slotted sleeve 91 rotated by pin 92 is actuated by a flexible cable control 93 having a handle 94 set in the flooring or other convenient location in the aircraft. Bracket 95 and clamp 96 serve as an anchor for the cable control. A pneumatic cylinder 97 of any suitable type, such as that in use on automatic booster brakes, and having a housing made in two hollow parts 98 and 99 is bolted by bolts 100 through spacer blocks 101 to bracket 90. Within the cylinder 97 and firmly secured around its outer periphery is a flexible diaphragm 102 which is bolted between the hollow chambers 98 and 99. For purposes of convenience, hollow chamber 98 will be designated the forward chamber and hollow chamber 99, the rear chamber. The diaphragm 102 is attached to one end of the piston rod 85 by plates 103 riveted to each other through the center of the diaphragm 102 and to one of which plates the end of the piston rod may be welded. Gland 104 provides effective sealing means for the aperture through which the piston rod moves.

Tabs 105 of the bracket 90 are each pivotally mounted with bolts 106 to clevises 107 integral with a supporting member 108 attached to the previously mentioned chief supporting member 81. Additional supporting members 109 may be provided as required.

Figures 12 and 13 illustrate diagrammatically the operation of a travel regulating device similar to that shown in Figures 9, 10, and 11. A fixed outer sleeve 88' has two longitudinal slots 110 adapted to receive lugs 86' on the piston rod 85'. The inner sleeve 91' is rotatable and similarly slotted to receive the lugs. Traveling in a transverse slot 111 in the outer sleeve 88' is a pin 92' which is resiliently attached to the inner sleeve 91' in such a manner that movement of the pin 92' in transverse slot 111 rotates inner sleeve 91' to cause the slots in the inner sleeve to become aligned with the corresponding slots 110 in the outer sleeve. This rotation is effected by any suitable means which may be attached to pin 92'. It will be understood that when the inner sleeve is in the position of Figure 13, forward travel of the piston rod is limited since the lugs 86' are abutted on the inner sleeve 91'. However, when inner sleeve 91' is turned to the position of Figure 12, the piston is permitted to travel farther forward which in turn serves to lower the arm to a nearly vertical position.

Operation of the arm is effected by movement of the diaphragm in the cylinder acting through piston rod 85 and lever 82 in a manner very similar to the hydraulically actuated piston of Figures 1 to 6. The pneumatic control mechanism is also generally similar to a hydraulic control system.

Such a control system is shown diagrammatically in Figures 14 and 15. The intake port 112 of a pump 113 is connected to an accumulator 114 through a check valve 115 and line 116. A four-way selector valve 117, illustrated diagrammatically, has four ports, one of which 118 is connected to the accumulator; another port 119 is open and serves as a vent; the third port 120 is connected to the forward chamber 98 through line 121 and chamber port 122; the fourth port 123 of the selector valve is connected to the rear chamber 99 by line 124 and chamber port 125. When the selector valve is turned to the position shown in Figure 14 so that the forward chamber 98 is connected to the accumulator through ports 118 and 120 and rear chamber 99 is vented through ports 119 and 123, the diaphragm will be urged forwardly by external pressure entering through port 119 and the arm will be lowered to its normal operating position somewhat as indicated in Figure 14. The position indicated by dotted lines in Figure 14 shows the approximate position of the arm when the piston is permitted its maximum forward travel by suitably turning the inner sleeve as described above.

Figure 15 illustrates the position to which the selector valve is turned to raise the arm. By turning a plug 126 of the valve so that the rear chamber 99 is connected to the accumulator through port 118 and port 123 and forward chamber 98 is vented through port 119 and port 120, the low pressure previously existing in the forward chamber 98 may now be replaced by atmospheric or other pressure which urges the diaphragm and piston towards the rear chamber 99 which operation is substantially the reverse of that previously described for lowering the arm.

The vacuum or low pressure created by the pump and stored in the accumulator is maintained by means of check valve 115 which is located between the pump and the accumulator.

The accumulator provides, in addition to its function of actuating the diaphragm, a convenient resilient cushion for absorbing any sudden stress which may be imposed upon the arm to suddenly change its position.

The arm may, of course, be stopped in any position by putting the valve into neutral, but I prefer a positive means of arm positioning, the piston travel regulating devices, whereby as the piston rod is drawn into its retracted position by the contained vacuum pressure acting on the flexible diaphragm, the lugs of the regulating device thrust against the unslotted edge of the inner sleeve preventing the piston from utilizing its maximum stroke to carry the arm beyond its predetermined pick-up position. If in order to assure the arm clearing a trailing load, a substantially vertical arm position is desired, the slots may be placed in alignment so that the lugs of the piston rod may fit into the slots allowing the piston rod to be fully retracted and permitting the arm to travel down into a substantially vertical position.

Figures 7 and 8 illustrate how my invention lends itself to installation in various types of aircraft.

Bracket 25, which may be a mounting for either a hydraulic or pneumatic type of cylinder, is mounted in Figure 8 near a hatch 127 or bomb bay in a pick-up aircraft. Line 128 attaches hook 71 to shock absorbing winch 129, which is positioned at any convenient location inside the fuselage. The line may be guided around pulley 130 to carry the load after the hook has been disconnected from the end of the arm and the glider or other load is being towed.

In order to prevent the arm in its raised position from interfering with control surfaces on the aircraft and to permit easy access to the tip of the arm or installing the hook thereon, the pivot and mounting bracket may be located considerably forward of the hatch, as shown in Figure 7. In ordinary flight, the bomb bay door 131 is closed and the arm raised on the outside of the fuselage. Preparatory to making a pick-up with such an installation, the arm 20 would be lowered, bomb bay door opened, the arm raised, hook placed on the end of the arm, and then the arm is lowered to pick-up position substantially as shown in Figure 7.

Accurate and positive positioning of the hook at the end of the arm has been one of the larger problems in air pick-up work and my invention, which permits access to the tip of the arm, has eliminated a serious disadvantage.

It will be understood that my invention contemplates the use of both gases and liquids. The ones which have been tried and found to be effective being oil and air. However, other fluids, such as compressed gases of many types, notably carbon dioxide and liquids such as water, glycerine, alcohol, diethylene glycol, could be used under suitable conditions of temperature and pressure. Naturally, the appropriate arm actuating equipment would be adapted to utilize, if possible, the fluid system of the particular aircraft used to operate accessories such as flaps, landing gear, etc.

Thus I have disclosed a system which provides a means of automatically positioning a pick-up arm, whereby the resiliently cushioned arm is controlled over a wide range of positions with regulating devices which may be placed conveniently without regard for the location of the arm.

While certain novel features of the invention have been disclosed herein with considerable detail with respect to certain particular forms of the invention, it is not desired to be limited to such details since many changes and modifications may well be made without departure from the spirit of the invention in its broadest aspect.

Having thus described my invention, I claim:

1. An aircraft adapted for picking up a burden in flight, an arm mounted to extend exteriorly of said aircraft, a support for said arm, a pivot for said support whereby the arm may be raised and lowered, a lever attached to said support, a rod attached to said lever, a fluid cylinder, a piston in said cylinder connected to said rod and adapted to reciprocate in the cylinder, means for indicating the angular position of said arm with respect to the aircraft including a scale and a pointer, a selector valve, fluid lines leading from opposite ends of the cylinder to the valve, a fluid pump, a fluid reservoir, and lines connecting said chamber and reservoir whereby fluid under pressure may be selectively introduced into each end of the cylinder.

2. An aircraft having a pick-up arm, a pivotal support for said arm whereby the arm may be raised and lowered, a lever attached to said support, a rod attached to said lever, a fluid chamber, a pressure responsive diaphragm in said chamber, said diaphragm being connected to said rod, means for regulating the operative travel of said rod including a pair of lugs on said rod, a stationary sleeve enclosing said rod and having slots, an inner rotatable sleeve also having slots, control means whereby the slots in said inner sleeve may be aligned with the slots in said stationary sleeve, a selector valve, lines leading from said selector valve to the chamber, an accumulator providing a resilient fluid cushion for said arm, a line connecting said accumulator to said chamber, means for venting said accumulator to permit desired raising and lowering of said arm.

3. An aircraft, a pick-up arm depending from said aircraft, a hook releasably positioned by said arm, an arm supporting trunnion, a lever attached to said trunnion, a rod adjustably attached to said lever, a slotted collar rotatably surrounding said rod, a stop attached to said rod and adapted either to engage said collar or be received in a slot therein, means for rotating said collar to different positions for engagement by said stop, a diaphragm attached to said rod, a housing for said diaphragm, means for controlling the pressure on either side of said diaphragm including a length of fluid carrying line, a selector valve, and a compressible fluid pressure generating device.

4. In an air pick-up system, an aircraft, a pick-up arm depending from said aircraft, a hook releasably positioned by said arm, an arm supporting trunnion, a lever attached to said trunnion, a rod adjustably attached to said lever, a fluid motor comprising a diaphragm attached to said rod and a housing for said diaphragm, a compressible fluid, a pressure generating device for supplying fluid to either side of said diaphragm, and means connecting said pressure generating device and said motor including a selector valve and accumulator whereby fluid may be compressed in the accumulator by limited movement of said arm.

5. In an air pick-up system, an aircraft, a pick-up arm pivotally attached to said aircraft, a hook carried by said arm, a trunnion for said arm, a rod attached to said trunnion, a fluid chamber operatively associated with said rod, a selector valve for permitting ingress and egress of said fluid into said chamber whereby the arm may be raised and lowered, resilient shock absorbing means for relieving excessive pressure in said chamber to permit limited upward travel of said arm whereby the shock in the arm of making a pick-up is absorbed without breaking the arm or dislodging the hook from its proper position and means for regulating the operative travel of said rod including a pair of lugs on said rod, a stationary sleeve enclosing said rod and having slots, an inner rotatable sleeve also having slots, and control means whereby the slots in said inner sleeve may be aligned with the slots in said stationary sleeve.

MICHAEL WILLIAM MANCINI.

REFERENCES CITED

The following references are of record in the file of this patent:

UNITED STATES PATENTS

| Number | Name | Date |
|---|---|---|
| 708,332 | Ennor | Sept. 2, 1902 |
| 1,003,890 | Eveleth | Sept. 19, 1911 |
| 1,338,970 | Burton et al. | May 4, 1920 |
| 1,403,290 | Catching | Jan. 10, 1922 |
| 1,410,098 | Hamilton | Mar. 21, 1922 |
| 1,822,658 | Kampmeyer | Sept. 8, 1931 |
| 2,014,557 | Clampitt | Sept. 17, 1935 |
| 2,260,490 | Stelzer | Oct. 28, 1941 |
| 1,735,385 | Fisher | Nov. 12, 1929 |

FOREIGN PATENTS

| Number | Country | Date |
|---|---|---|
| 486,556 | Great Britain | June 7, 1938 |
| 525,016 | Great Britain | Aug. 20, 1940 |